United States Patent [19]
Milburn et al.

[11] Patent Number: 5,524,233
[45] Date of Patent: Jun. 4, 1996

[54] METHOD AND APPARATUS FOR CONTROLLING AN EXTERNAL CACHE MEMORY WHEREIN THE CACHE CONTROLLER IS RESPONSIVE TO AN INTERAGENT COMMUNICATION FOR PERFORMING CACHE CONTROL OPERATIONS

[75] Inventors: Blair D. Milburn, Beaverton; Phillip G. Lee; Milind A. Karnik, both of Aloha, all of Oreg.

[73] Assignee: Intel Corporation, Santa Clara, Calif.

[21] Appl. No.: 40,680

[22] Filed: Mar. 31, 1993

[51] Int. Cl.⁶ .................................................. G06F 13/00
[52] U.S. Cl. .................... 395/468; 395/449; 395/451; 395/460; 395/462; 364/243.41; 364/243.45; 364/964.2; 364/964.343; 364/DIG. 1; 364/DIG. 2
[58] Field of Search ................. 364/243.45; 395/427, 395/445, 446, 448, 449, 451, 460, 462, 468, 473, 474

[56] References Cited

U.S. PATENT DOCUMENTS

| | | |
|---|---|---|
| 4,829,425 | 5/1989 | Bain, Jr. et al. .................... 395/275 |
| 5,214,770 | 5/1993 | Ramanujan et al. .................... 395/425 |
| 5,241,681 | 8/1993 | Hamid et al. .......................... 395/800 |
| 5,247,643 | 9/1993 | Shottan ................................... 395/425 |
| 5,276,848 | 1/1994 | Gallagher et al. .................... 395/425 |
| 5,287,523 | 2/1994 | Allison et al. ........................ 395/725 |
| 5,293,384 | 3/1994 | Keeley et al. ........................ 371/16.3 |
| 5,325,499 | 6/1994 | Kummer et al. ...................... 395/425 |
| 5,345,576 | 9/1994 | Lee et al. .............................. 395/425 |
| 5,347,648 | 9/1994 | Stamm et al. ........................ 395/575 |
| 5,394,529 | 2/1995 | Brown, III et al. ................... 395/375 |
| 5,398,325 | 3/1995 | Chang et al. ......................... 395/425 |

*Primary Examiner*—Tod R. Swann
*Assistant Examiner*—Frank J. Asta
*Attorney, Agent, or Firm*—Blakely, Sokoloff, Taylor & Zafman

[57] ABSTRACT

A cache control method and mechanism for an external cache memory having multiple cache lines using interagent communications to cause invalidating the external cache memory, flushing the external cache memory and/or changing the coherency state of lines in the external cache memory.

43 Claims, 10 Drawing Sheets

METHOD AND APPARATUS FOR CONTROLLING AN EXTERNAL CACHE MEMORY WHEREIN THE CACHE CONTROLLER IS RESPONSIVE TO AN INTERAGENT COMMUNICATION FOR PERFORMING CACHE CONTROL OPERATIONS

FIELD OF THE INVENTION

The present invention relates to the field of computer systems and peripherals; more particularly, the present invention relates to computer systems that employ cache memories.

BACKGROUND OF THE INVENTION

Today, a large number of computer systems employ cache memories. A cache is a very fast, local storage memory that is used by the processor. Caches typically comprise fast, expensive static random access memories (SRAMs). In a data flow of a computer system, a cache is located between the microprocessor and the main system memory and holds copies of code and data that are frequently requested from the main system memory by the microprocessor, thereby improving the average memory response time.

A cache has three basic components: a data cache RAM, a tag RAM and cache management logic. The data cache RAM is the block of fast memory that stores copies of data or instructions frequently requested by the microprocessor. The tag RAM holds the main system memory addresses of the code and data stored in the data cache RAM plus additional status bits used by the cache management logic. Each entry in the tag RAM is called a "tag". The cache management logic compares the memory requests of the microprocessor, which are in the form of memory addresses, to the stored address in the tag RAM. When the memory request address matches an address stored in the tag RAM, the cache returns the information from the data cache RAM. This action is commonly referred to as a cache hit. If the memory request address does not match any entry in the tag RAM directory, the memory request is passed to the main memory of the computer system. This action is commonly referred to as a cache miss. When the information requested is returned from the main system memory to the processor, a copy may be stored in the cache for future use.

Caches are currently designed at one of a number of levels (e.g., first level caches, second level caches, etc.). A first level cache is a single layer of high speed memory between the microprocessor and the main system memory (typically, dynamic RAM (DRAM) memory) which stores copies of code and data most frequently requested by the microprocessor. Furthermore, first level caches are often on the same integrated circuit of the microprocessor and are typically small in size (e.g., 4 kilobytes (KB) to 64 KB). A second level cache is a second layer of high speed memory between the first level cache and the main system DRAM memory. The second level cache also holds copies of code and data frequently requested by the microprocessor. However, the second level cache is almost always larger than the first level cache (e.g., 64 KB to 512 KB), such that the second level cache is able to hold all of the data and code in the first level cache and more to compensate for first level cache misses. Note that while control for a first level cache is often on-chip with the cache, the control for a second level cache is often handled by a cache controller.

One primary concern with the use of caches involves multiprocessing systems. A cache consistency problem may arise from the fact that data from a given memory location may reside simultaneously in main memory and in one or more cache memories. Furthermore, the data in one cache may have a value different from that in memory, because one has been updated more recently. Such inconsistencies can arise in single processor systems where there are other bus masters, such as direct memory access (DMA) or intelligent device drivers besides the central processing unit (CPU), which can access the main memory. It is desirable to have a method and mechanism to ensure that all references to a main-memory location retrieve the most recent value of the data.

In multiprocessing systems where multiple processes can act on data and code, many caches implement a "write back" design with support for multiprocessing data consistency. A write-back cache memory may have data which is not updated in the main memory. Therefore, a mechanism is implemented to insure that the data read by any system bus master at any time is correct. That is, when a particular memory location in main memory is to be read, if the data is in a cache and has been modified, the data is written back to main memory before the data is returned for the read. In this manner, bus masters are always assured of obtaining the most up-to-date data.

The operation of writing data from the cache back into main memory is known as flushing the cache. There are two types of flushing. One type of flushing involves writing the data back to main memory because another processor desires the data. The other type of flushing occurs where a section (or all) of a cache is to be flushed or invalidated. This may occur to avoid the situation where data is desired by another processor. It is desirable to be able to cause the cache to be flushed (or invalidated) at times other than those specified by the write back algorithm.

Note that flushing a second level cache is usually performed by external logic, such as the cache controller. Furthermore, each flushing operation performed on the cache usually occurs one line at a time. The time required to specify each line individually adds to the overall operation time where multiple lines must be flushed. When data is written back to main memory, the use of the system bus takes longer because it is a slower bus. It would be desirable to take advantage of the faster local bus to write back the data in the cache. It would also be desirable to flush the cache without relying on the use of external mechanisms, such as a cache controller. Also it is desirable to flush more than one line of the cache at a time.

In multiprocessing systems, for another processor to cause data to be written back from the cache of another processor, a memory cycle must be initiated on the slow system bus. A snoop detector must recognize the address on the system bus as being in the cache, such that the memory bus cycle can be stalled to allow for the most recent copy of the data to be written back to the main memory. Therefore, in a multiprocessing environment, large amounts of time are consumed before data is even written back into the cache. It is desirable to have a processor in a multiprocessing system to be able to cause another processor to have the data in a cache written back to main memory.

In the prior art, software and hardware is used to maintain cache consistency between data stored in the main memory of the system and the cache memories. One cache consistency protocol known as the M.E.S.I. protocol (i.e., Modified, Exclusive, Shared and Invalid) is implemented in hardware. The MESI model is implemented by assigning state bits for each cache line. The MESI represents four states which define whether a line is valid (hit or miss), if it is available in other caches (shared or exclusive), and if it is modified (has been modified). These states are dependent on both the cache controller data transfer activities performed as a bus master and snooping activities performed in response to snoop requests generated by other memory bus masters.

Note that when using cache consistency protocols, such as MESI, upon powering up a computer system, data in the cache may be marked as valid. A reset routine normally performs a cache invalidation operation when a computer system is powered up, wherein each cache line is accessed and marked invalid one line at a time. Furthermore, this invalidation process occurs over the slow system bus. It is desirable to be able to invalidate more than one line at a time upon reset and to have such an invalidation process performed on a faster bus, such as the local bus. Moreover, it is also desirable to be able to alter the MESI state, other than by flushing the cache.

The present invention provides a method and means for having a processor control an external cache, such that no external logic is required. Furthermore, the present invention provides a mechanism to write back multiple lines of a cache in one operation and at times other than those specified by the normal writeback algorithm. The present invention also includes a method and apparatus for altering the MESI state of cache lines within the cache.

SUMMARY OF THE INVENTION

The present invention provides a method and mechanism for controlling an external cache. The cache of the present invention includes multiple cache lines. The present invention includes a method and means for transferring data and instructions. The present invention also includes a method and mechanism for fetching the instructions. An instruction decoder decodes the instructions, while an execution unit executes the instructions. The processor of the present invention also includes a method and mechanism for controlling the external cache, such that the external cache is controlled from within the processor.

BRIEF DESCRIPTION OF THE DRAWINGS

The present invention will be understood more fully from the detailed description given below and from the accompanying drawings of the preferred embodiments of the invention, which, however, should not be taken to limit the invention to the specific embodiments, but are for explanation and understanding only.

DETAILED DESCRIPTION OF THE INVENTION

A method and apparatus for controlling a cache is described. In the following description, numerous specific details are set forth such as specific numbers of bits, signals, states, etc., in order to provide a thorough understanding of the present invention. It will be obvious, however, to one skilled in the art that the present invention may be practiced without these specific details. In other instances, well-known computer operations and components have been shown in block diagram form, rather than in detail, to avoid unnecessarily obscuring the present invention.

Overview of the Computer System of the Present Invention

Figure 1:
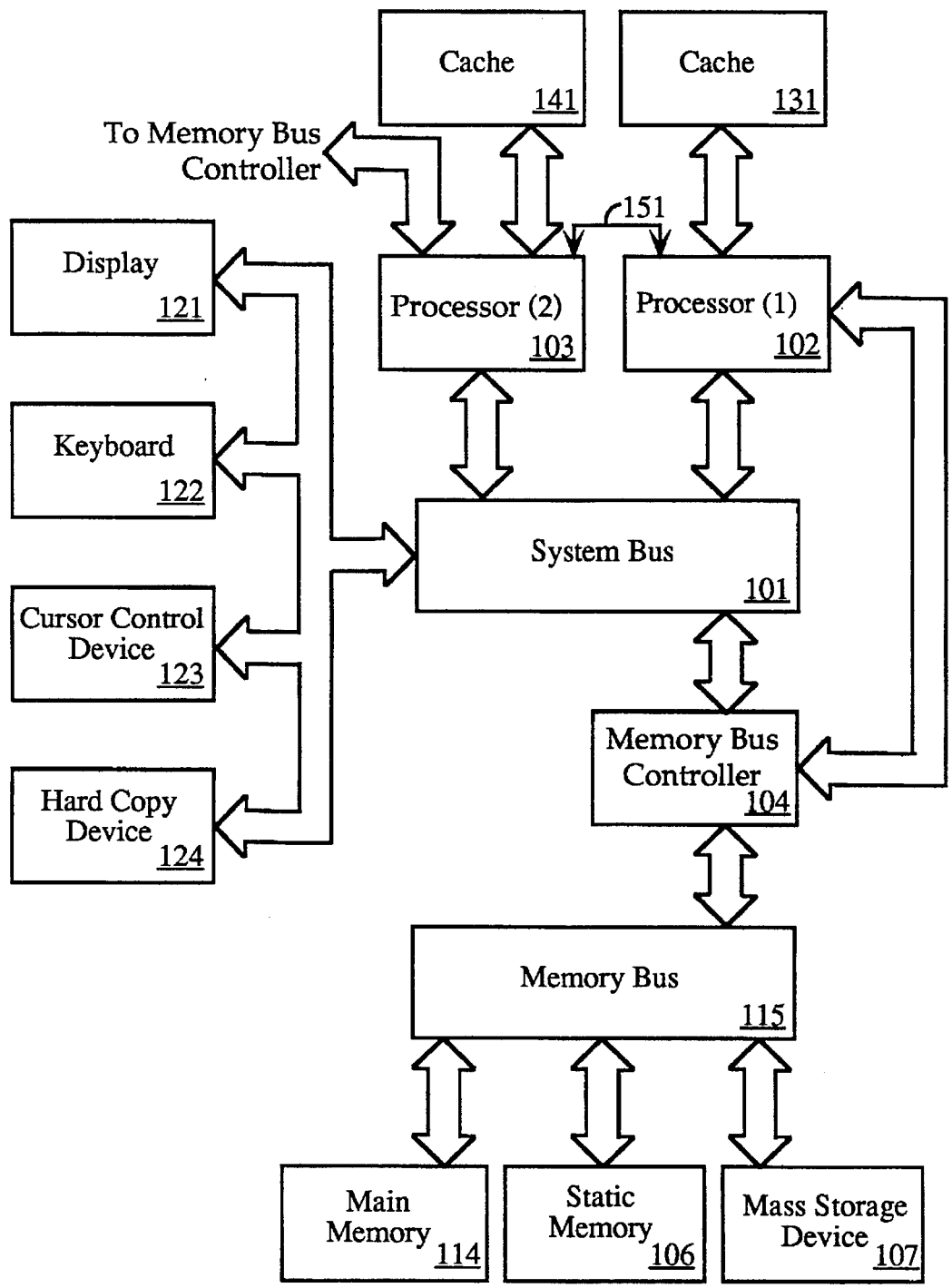
FIG. 1 is a block diagram of the computer system of the present invention.

Referring first to FIG. 1, an overview of a computer system of the present invention is shown in block diagram form. It will be understood that while FIG. 1 is useful for providing an overall description of the computer system of the present invention, a number of details of the system are not shown. As necessary for disclosure of the present invention, further detail is set forth with reference to the other figures provided with this specification. Further, the present invention is described with reference to its preferred embodiment; alternative embodiments which may be conceived by one of ordinary skill in the art are considered within the scope of the claims set forth below.

As illustrated in FIG. 1, a computer system, as may be utilized by the preferred embodiment of the present invention, generally comprises a system, a central processing unit (CPU), bus or other communications means 101 for communicating information, a processor (1) 102 coupled with system bus 101 for processing information, and a memory bus controller 104 coupled with system bus 101 for controlling access to a random access memory (RAM) or other dynamic storage device 114 (commonly referred to as a main memory) for storing information and instructions for processor 102. MBC 104 is coupled to processor 102 via byte enable latches (not shown). Also coupled to system bus 101 is processor (2) 103 for processing information in conjunction with processor 102. Note that processor 102 and processor 103 are coupled together by bus 151 for communicating information (e.g., interagent communications) between each other. Note that external logic (not shown) or one of the processors 102 and 103 or both could control the flow of information and signals on bus 151. MBC 104 is also coupled to memory bus 115.

Main memory 114 is coupled to memory bus 115. Also coupled to memory bus 115 is a read only memory (ROM) or other static storage device 106 for storing static information and instructions for processor 102 and processor 103 and a data storage device 107, such as a magnetic disk and disk drive for storing information and instructions.

The computer system also includes a display device 121, such as a cathode ray tube, liquid crystal display, etc., coupled to system bus 101 for displaying information to the computer user, an alphanumeric input device 122 including alphanumeric and other keys, etc., coupled to system bus 101 for communicating information and command selections to processor 102 and a cursor control device 123 coupled to system bus 101 for controlling cursor movement.

Moreover, the system includes a hard copy device 124, such as a plotter or printer, for providing a visual representation of the computer images. Hard copy device 124 is coupled with processor 102, main memory 114, static memory 106 and mass storage device 107 through system bus 101.

The computer system also includes caches 131 and 141 coupled to processor 102 and processor 103, respectively, for temporarily storing instructions and data for use in processor 102 and processor 103. Note that processor 102 and processor 103 may each include an internal cache as well. In the currently preferred embodiment, processor 102 and processor 103 are the i960™ brand of microprocessor from Intel Corporation of Santa Clara, Calif.

Of course, certain implementations and uses of the present invention may not require nor include all of the above components. For example, in certain implementations a keyboard and cursor control device for inputting information to the system may not be required. In other implementations, it may not be required to provide a display device for displaying information. Certain implementations and users of the present invention may include other components. For instance, a cache controller may be included for cache 141.

Overview of the Operation of the CPU/Cache Memory Systems

Processor 102 provides the main control element of cache 131 and includes the tags and line states. It tracks all system bus cycles and determines which cycles can complete on the system bus and which must be passed to the memory bus. It also provides decisions on accesses, hits or misses. In the currently preferred embodiment, processor 102 provides decisions on accesses, hits or misses based on variation of a MESI protocol. MESI represents four states. The states define whether a line is valid (hit or miss), if it is available in other caches (shared or exclusive), and if it is modified (has been modified). The four states are:

[M] -MODIFIED: This state indicates a line which is exclusively available in only this cache, and is modified (main memory's copy is stale). A modified line can be updated locally in the cache without acquiring the memory bus. Because a modified line is the only up-to-date copy of data, it is the processor's responsibility to write-back this data to memory on snoop accesses to it or on cache line replacements.

[E]-EXCLUSIVE: Indicates a cache line which is exclusively available in only this cache, and that this line is not modified (main memory also has a valid copy). Writing to an exclusive line causes it to change to the modified state and can be done without informing caches, so no memory bus activity is generated.

[S]-SHARED: Indicates that this line is potentially shared with other caches (The same line may exist in one or more other caches). A shared line can be read by the processor without a main memory access. Writing to a shared line updates the cache, and also requires the processor, which acts as a cache controller to the level two external cache, to generate a write-through cycle to the memory bus or to cause the copies in the other caches to be marked invalid. In addition to updating main memory, the write-through cycle will invalidate this line in other caches. Since writing to a shared line causes a write-through cycle, the system can enforce a "write-through policy" to selected addresses by forcing those addresses into the [S] state.

[I]- INVALID: Indicates that the line is not available in the cache. A read to this cache line will be a miss and will cause the processor of the present invention to execute a line fill (fetch the entire line and deposit it into the cache SRAM). A write to this cache line will cause the processor to execute a write-through cycle to the memory bus and in some circumstances initiate an allocation.

Processor 102 handles the system bus requests completely and coordinates with MBC 104 when an access requires control of memory bus 115. Processor 102 also controls the cache data paths for both hits and misses to provide it with the correct data. Processor 102 also provides cycle requests to MBC 104 and the address to memory bus 115 for cache misses. Processor 102 controls the writing of data to and from cache 131. When data is desired by processor 102, and it is not in cache 131, processor 102 sends the memory request on the system bus to MBC 104 which provides the necessary access to memory bus 115, and thus the memory. The data corresponding to the memory request is then sent through MBC 104 to the system bus, where processor 102 obtains the data. Processor 102 then stores data in the external cache 131 as well as its internal cache(s).

If external cache 131 is to be flushed, processor 102 reads the data from external cache 131 and then writes the data to main memory 114, via system bus 101 and MBC 104. Also, processor 102 controls the coherency state of its external, or backside, cache 131. If the coherency state of the line or multiple lines or blocks in cache 131 is to be changed, then processor 102 writes the new coherency state to the cache directory. In other words, processor 102 is responsible for changing the bits in the cache directory of cache 131.

Processor 102 is also responsible for performing memory bus snoop operations while other devices are utilizing memory bus 115. Snooping refers to the operation whereby processor 102 monitors shared memory bus 115 to determine whether or not other devices sharing memory bus 115 have a copy of the accessed cache line. Processor 102 snoops both for its second level cache 131 and for its primary (internal) cache, based on the principle of inclusion. Note that processor 103 provides the same control function to cache 141 as processor 102 does to cache 131 in some embodiments.

Memory bus controller (MBC) 104 adapts processor 102 and processor 103 to the specific memory bus protocol associated with memory bus 115. In doing so, it coordinates with processor 102 and processor 103 for line fills, flushes, write-backs, etc.

MBC 104 is defined to adapt to a single implementation of a CPU for a wide range of memory bus protocols in order to support a wide range of applications. It is capable of supporting a synchronous or asynchronous interface to a clocked or strobed memory bus. In some cases, it may even be directly connected to a DRAM interface. These different protocols are supported at memory bus widths of 32, 64 and 128-bits. MBC 104 includes the logic responsible for implementing the memory bus protocol. This logic is responsible for the memory bus arbitration, data transfer and cache consistency functions as well as controlling the transceivers in the cache controller and in the cache data slice. Note that cache 131 (and cache 141) is not coupled to memory bus 115.

In the currently preferred embodiment, the external, or backside, cache 131 is coupled directly to processor 102 using a 64 pin data bus. In the currently preferred embodiment, caches 131 and 141 are implemented as a plurality of individual SRAM integrated circuits coupled in parallel to accommodate the specific memory requirements of the microprocessor system. Each SRAM integrated circuit includes latches, multiplexers (also referred to as MUXs), logic and memory storage which allow it to work in lockstep with processor 102 to efficiently service both hit and miss accesses.

Overview of the Processor of the Present Invention

Figure 2:
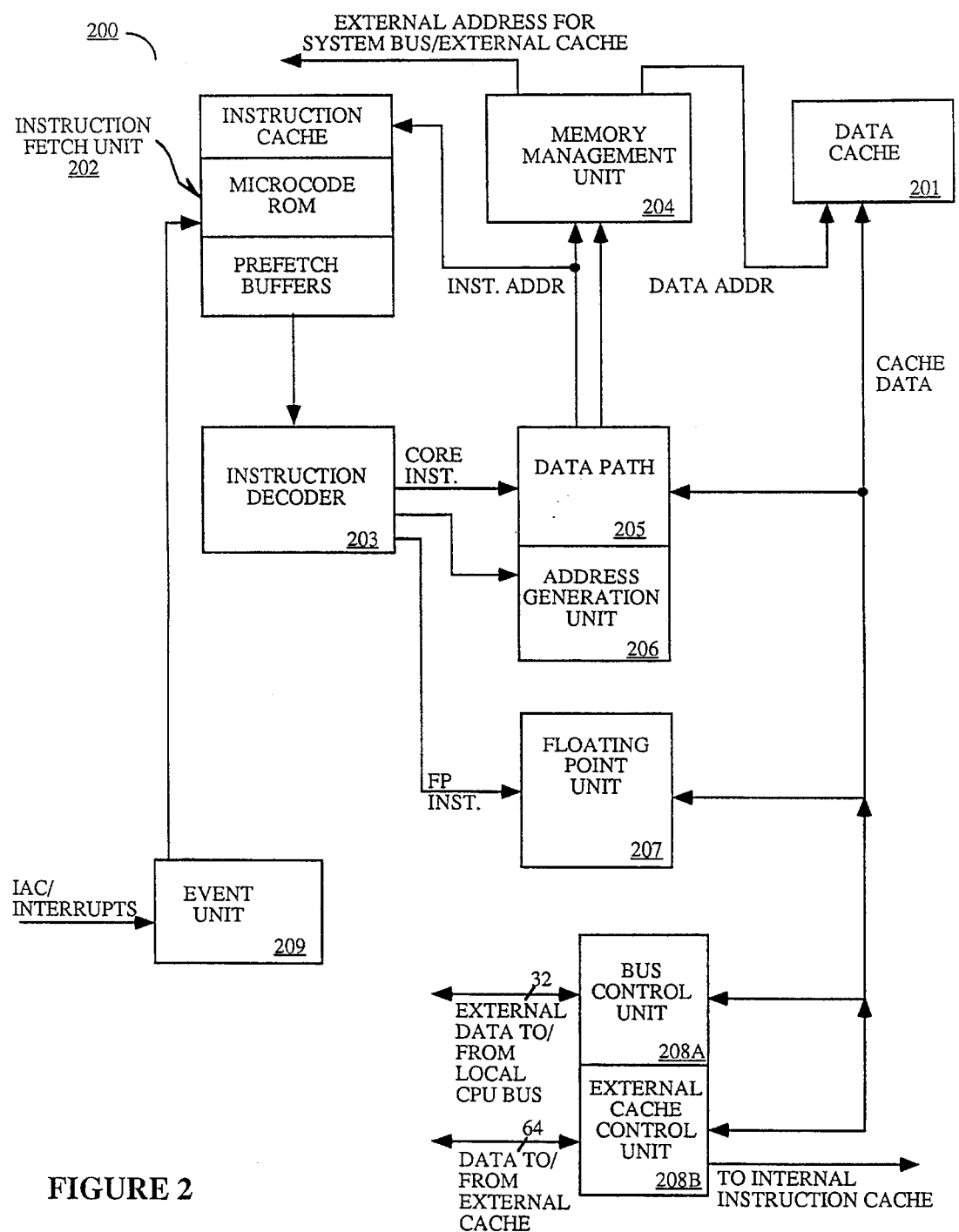
FIG. 2 is a block diagram of the currently preferred embodiment of the processor of the present invention.

FIG. 2 shows a block diagram of the processor 200, utilized by the preferred embodiment of the present invention. Processor 200 is preferably manufactured as an integrated circuit using a metal-oxide semiconductor (MOS) process. Referring to FIG. 2, processor 200 generally comprises data cache 201, instruction fetch unit 202, instruction decoder 203, datapath 205, address generator 206, floating-point unit 207, system interface and buffers 208A, memory management unit 204, external cache control unit 208B, and event detection unit 209. A clock generator (not shown) provides the clock signals to the components of processor 200.

Bus control unit 208A provides a data interface between processor 200 and the system bus of the computer system. Bus control unit 208A includes the bus controller and provides the necessary interface between the internal buses of processor 200, and in particular the external buses responsible for fetching data from the main memory. In the currently preferred embodiment, the present invention uses an external 32-bit address bus and a 32-bit data bus.

Instruction decoder 203 decodes the incoming instructions. Instruction decoder 203 is coupled to receive the instructions from instruction fetch unit 202 and sends the decoded instructions, in the form of microcode, to data path 205 and floating point unit 207 for execution.

Instruction fetch unit 202 includes the instruction cache and contains a microcode ROM which stores the microcode instructions (microcode) for processor 200. The microcode ROM shares control of instruction execution with instruction decoder 203 in a manner well-known in the art. The microcode ROM provides address generator 206 with address information which address generator 206 uses to generate addresses corresponding to data necessary in the execution of the decoded instructions. Address generator 206 provides the addresses for either datapath 205 or floating point unit 207 depending on the instruction type.

The microcode ROM is also responsible for instruction boundary processing, such as interrupt/exception arbitration, and the halting of instruction decoder 203 when necessary. The microcode ROM is also responsible for handling most of the freeze conditions and cache maintenance conditions, such as cache memory miss, etc.

Datapath 205 is the main execution data path for processor 200. In the currently preferred embodiment, datapath 205 is a reduced instruction set computer (RISC) core. Datapath 205 contains the arithmetic logic unit, register file, barrel shifter, read-only memory (ROM) and flags. Datapath 205 is coupled to receive data from data cache 201, and instructions from the instruction cache (via instruction fetch unit 202). Datapath 205 requests instructions from the instruction cache and data from data cache 201 via separate address lines coupled to the instruction fetch unit 202 and data cache 201 through memory management unit 204. These address lines are also received by memory management unit 204 which generates external addresses to obtain data and instruction information which is not in the internal caches of the processor. In the currently preferred embodiment, memory management unit 204 includes a translation-look-aside buffer (TLB), which operates in a manner well-known in the art. Datapath 205 executes the microcode provided by instruction decoder 203 using the data received from data cache 201 according to the addresses generated by address generator 206. Processor 200 also includes floating point unit 207, which is coupled to address generator 206. Floating point unit 207 contains logic to execute the floating point instructions.

Both data cache 201 and the instruction cache of instruction fetch unit 202 are coupled to receive data and instructions from the external cache via external control unit 208B. Cache control unit 208B includes the buffers and control circuitry necessary to interface with the external cache. The buffers include the hit/miss logic, while the control circuitry includes the tag comparison hardware, parity checking hardware, and state bits. The state bits provide the MESI protocol state for a particular cache line. The state bits are held in registers. Note that microcode can access the state bits. Note also that the replacement algorithm for the external cache can be implemented in microcode, can be handled by an external unit on the system bus (since this bus must be monitored anyway) or can be done automatically by hardware for "normal" replacements (such as when the cache fills up and a request for new data occurs). The data bus between the external cache and the external cache bus control unit 208B is a 64-bit data path, which supplies data cache 201 with data and the internal instruction cache with instructions. Note that bus control unit 208A and cache control unit 208B are shown as separate units to avoid confusion.

The present invention also includes event unit 209 which receives interrupts and communications from the computer system including the other processor in the computer system. In response to receiving an interrupt or processor communication, event unit 209 causes the microcode to branch to a microcode routine to handle the event. This occurs in a manner well-known in the art. One type of communication received from other processors is an interagent communication.

Interagent Communication

An interagent communication (IAC) is a special message sent by the processor of the present invention to itself or to another processor. In the present invention, IACs are used for processor management. In the present invention, one of the utilizations of an IAC message is to control the external cache. In one embodiment, the control of the external cache may be used to initialize the cache to a known state, such as during the reset of the cache. Note that the present invention may be used at times other than reset or initialization of the cache.

The currently preferred embodiment of the present invention includes a Flush/Modify Coherency of External Cache IAC for controlling the cache. A memory manager in the processor uses the cache control IAC to manage its external cache. In the currently preferred embodiment, the memory manager includes the external cache bus control logic 208B operating in conjunction with the microcode.

IAC Message Format

Figure 3:
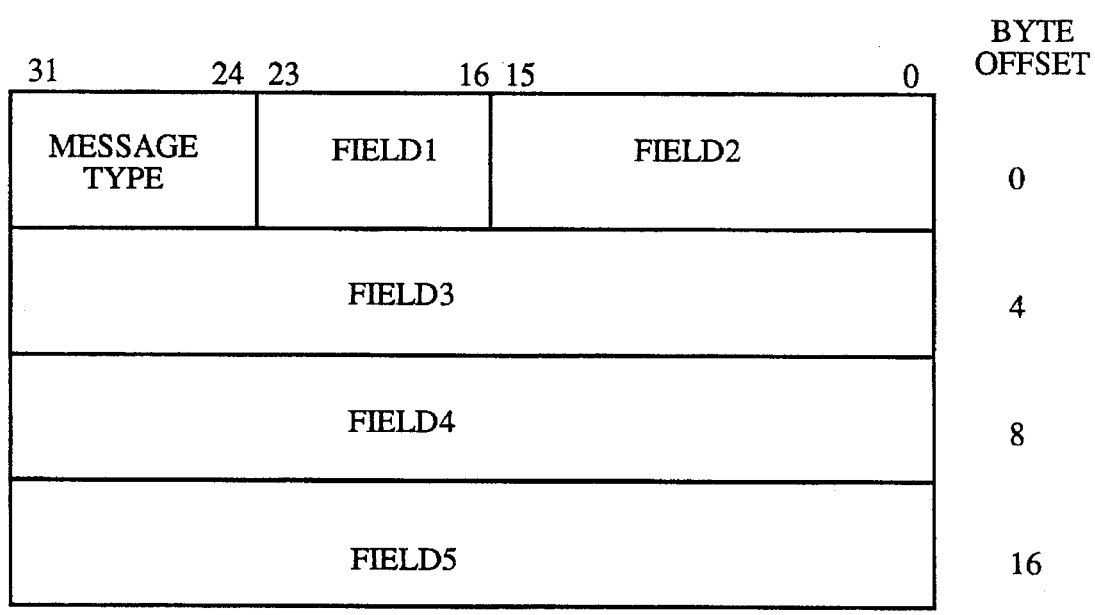
FIG. 3 illustrates the currently preferred embodiment of the Inter Agent Communication (IAC) message of the present invention.

The format of an IAC message of the present invention is shown in FIG. 3. Referring to FIG. 3, the currently preferred embodiment of an IAC message comprises four words aligned on a quad-word boundary. In the present invention, an IAC message includes a message field and up to five other fields. In the currently preferred embodiment, the IAC message includes a message type field of 8-bits and up to five additional fields defined by the particular message type. In the present invention, the message type functions like an opcode, therein identifying the operation to be performed. In the currently preferred embodiment, the 8-bit message type occupies the eight most significant bits of the first of the four aligned words. In the currently preferred embodiment, the next 8-bits represents Field1. Similarly, the 16-bits following Field1 in the first word represent Field2. Thus, in the currently preferred embodiment, Field1 can hold an 8-bit parameter, while Field2 can hold a 16-bit parameter. In the currently preferred embodiment, Field3, Field4, and Field5 can each hold 32-bit parameters and each are one word (in length) of the quad word.

In the present invention, the IAC message uses only some of these fields. In the currently preferred embodiment, unused fields are ignored. If the processor of the present invention receives an IAC and the message type is not recognized by the processor, then the processor simply discards the IAC. Note that the message types may not be recognized due to an error in hardware or a programming error.

Flush/Modify Coherency of External Cache IAC

The present invention provides a method and mechanism for controlling an external cache. The present invention controls the external cache using an IAC. The currently preferred embodiment of the field designations of the IAC message of the present invention is shown below:

| Msg. Type: 9B HEX | | |
|---|---|---|
| Parameters: Field2 | Contains control bits: | |
| | bit 0 | 0 (flush) or 1 (modify coherency state) |
| | bit 1 | 0 (data cache) or 1 (instruction cache) |
| | bit 2 | 0 (enable match) or 1 (disable match) |
| | bits 6:7 | coherency state |
| Field3 | Quad-aligned starting physical address of the flush | |
| Field4 | Quad-aligned ending physical address of the flush. The addressed quad is the last quad flushed or modified. | |

Field2 of the IAC memory contains the control bits used by cache control unit 208B to control an external cache. In the currently preferred embodiment, bit 0 indicates that the cache is to be flushed or whether its coherency state is to be modified. Bit 1 indicates that the operation is to be performed on the data cache or on the instruction cache. Bit 2 indicates whether a match is required or not required when completing the operation. Bits 6 and 7 indicate the coherency state that is to exist after the operation is performed.

By setting the control bits, the user can specify what operations are to be performed on an external cache. For example, by setting bits 0, 1, 6 and 7 to the proper state, the present invention allows a flush or invalidation action to be performed on either an external instruction or data cache.

The cache control IAC of the present invention writes the specified coherency state to either the external (i.e., backside) data cache or the external (i.e., backside) instruction cache. If the match control bit (bit 2 of field 2) is 0, then whether the write back is performed depends on matching in the backside cache.

If the instruction cache is specified, the line will be written. If the data cache is specified, control bit 0 will determine whether the line is either written or flushed and written (if the line was modified). Note that if the match bit is set to 1, matching is disabled, such that the address will always result in a hit. In this manner, the present invention allows it to be specified whether the operation(s) to be performed should be based upon whether or not the given address hits the external cache.

Field3 and Field4 provide the address range upon which the operation specified in the control bits are to be performed. By being able to specify an address range instead of a single cache line address, the present invention can flush, modify the coherency state, or invalidate portions or all of external cache using one command.

In the present invention, Field3 and Field4 are aligned on quad (16-byte) boundaries. In the currently preferred embodiment, if a non-aligned starting address is used, then bytes in the quad before the starting address may also be invalidated. In the currently preferred embodiment, if a non-aligned ending address is used, then bytes in the quad containing that address may not be invalidated. To invalidate one 16-byte line in an external cache, both Field3 and Field4 should be specified as the physical address of the line.

The IAC of the present invention is used for software external cache management. If the coherency state in bits 6–7 is set to 00, then the IAC of the present invention is used to invalidate sections of the external cache.

In the present invention, if the cache is to be flushed (Field2 bit 0=0), the match (Field2 bit 2=0) must be specified or undefined results will be obtained.

The currently preferred embodiment of the coherency state encodings are as follows:

| 00 | Invalid |
|---|---|
| 01 | Shared |
| 10 | Exclusive |
| 11 | Modified |

The present invention includes two types of IACs: internal and external. In the present invention, an IAC is an internal IAC if a processor sends the IAC to itself. In the present invention, an IAC is an external IAC if a processor sends the IAC to another processor or to itself (by performing a write to memory), such as in a multiprocessing system.

Internal IACs

The currently preferred embodiment of the present invention provides two methods of sending internal IACs: a synmovq instruction and a selfiac instruction. The synmovq instruction represents a synchronous move instruction for moving a quad word. In the currently preferred embodiment, if the destination physical address is specified in the synmovq instruction as FF00_0010Hex, then the quad-word is not written to memory. (Note that the underscore is added to the hexadecimal numbers only to improve their readability.) The microcode which implements the syncmovq instruction detects this special destination address and jumps to the microcode to handle IACs. This microcode routine reads the IAC message from memory.

In the currently preferred embodiment, if the processor is in virtual addressing mode, then the linear or virtual address specified for the destination must map to FF00_0010 to send an internal IAC. If virtual addressing mode is used, then page rights may be used to grant access to supervisor-mode code and deny access to user-mode code. In this manner, a system prevents users from causing an IAC. The paging mechanism allows for user writable pages and supervisor (i.e., system) writable pages. If virtual addressing is used, the page (or virtual address) which translates to physical address FF00_0010Hex can be made a supervisor only page. Therefore, if a user attempts to access this page, a fault will occur, such that the access is prevented before causing a self IAC.

In the currently preferred embodiment, the selfiac (SELF IAC) instruction specifies a register quad (i.e., four registers containing an IAC message) and sends an internal IAC to the executing processor. However, instead of writing the message to memory, the IAC is automatically received as an IAC by the executing processor, The quad word is used as the IAC's value. The execution of the selfiac instruction causes the microcode to jump to a routine to handle the Flush/Modify coherency of an external cache IAC. In the currently preferred embodiment, the selfiac instruction must be executed in supervisor mode or else a fault results. The fault is signaled in user mode.

External IACs

The present invention allows external IACs to be sent. The present invention includes a method and means for distinguishing and identifying processors in a multiprocessor system when sending external IACs. The processor(s) of the present invention uses a 10-bit processor ID to identify a processor. The processor ID is encoded into the physical address of the memory at which the IAC message is stored. In this manner, the processor ID can distinguish up to 1,024 processors.

In the present invention, an external IAC is sent by a processor by storing a quad word to a physical address in main memory reserved for sending external IACs. The physical address encodes the destination processor ID and a priority associated with the IAC. In the currently preferred embodiment, the processor ID is encoded in bits 23-14 and the priority is encoded in bits 8-4 of the words. The present invention includes external logic (e.g., the sending processor) which uses the priority associated with the IAC in conjunction with an external priority register to decide whether to interrupt the destination processor with the IAC. In the present invention, the IACs are at the highest priority. In the currently preferred embodiment, the encoded priority is ignored.

Receiving an External IAC

The processor of the present invention receives an external IAC in conjunction with external logic (e.g., another processor). The processor receiving the IAC checks for IACs at the same point it checks for interrupts. If the external logic chooses to interrupt the processors of the present invention with an external IAC, it asserts the IAC pin. In the currently preferred embodiment, the IAC pin is asserted by another processor.

When a processor receives an IAC, it executes the IAC. In the present invention, the IAC is handled as the highest priority interrupt, regardless of its own encoded priority. In the currently preferred embodiment, an IAC's execution cannot be interrupted, not even by a non-maskable interrupt (NMI). However, in the present invention, the processor does check its NMI pin before checking the IAC pin.

It should be noted that in the currently preferred embodiment, IACs can be received and processed in all defined processor states, including the stopped state.

Figure 4:
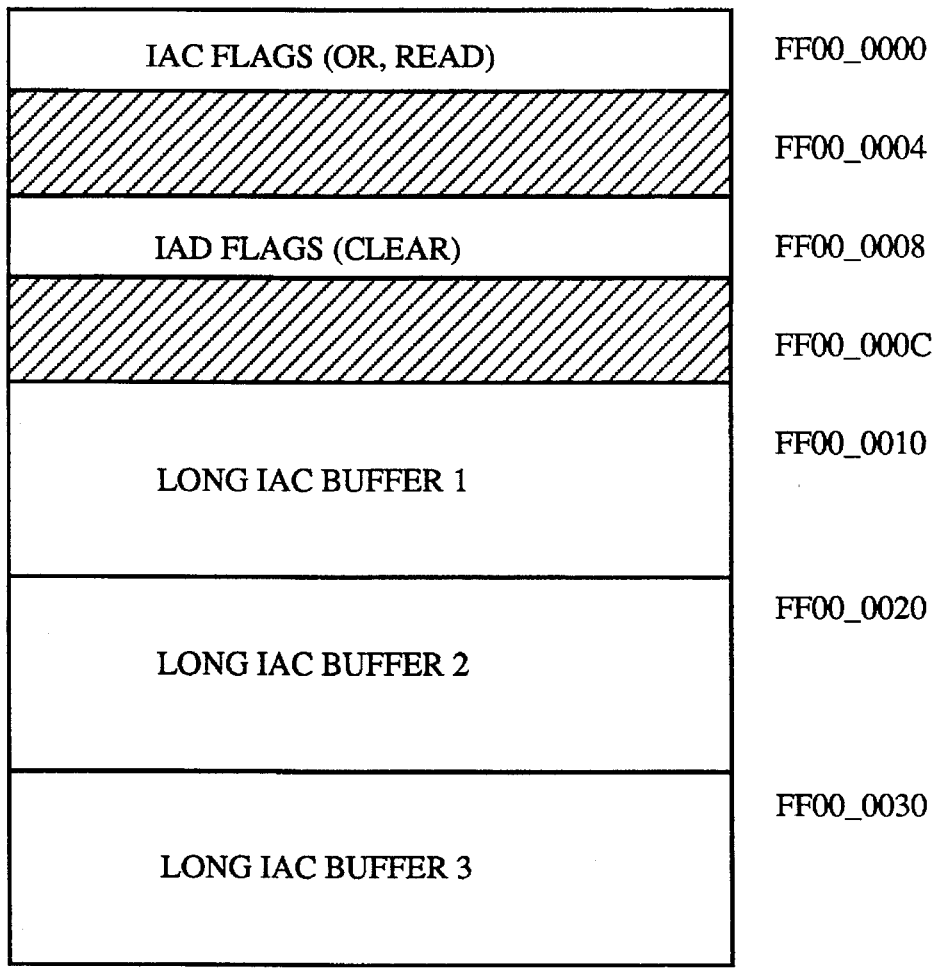
FIG. 4 illustrates the currently preferred embodiment of the IAC memory allocation of the present invention.

The execution mode when executing an IAC is whatever the execution mode was outside the IAC, either the current process's execution mode (user or supervisor) or supervisor mode if the processor is interrupted, idle, or stopped. FIG. 4 shows the physical addresses used to receive external IACs. Referring to FIG. 4, the IAC flags are stored at physical address FF00_0000 in main memory, while the IAC flags cleared are at physical address FF00_0008. Three buffers are provided for in the memory space, at physical addresses FF00_0010, FF00_0020, and FF00_0030 for storing IAC messages.

The external IAC flags register is accessed at two different addresses. In the present invention the flags are read once the IAC is asserted to determine the IAC type. Depending on which bit is set in the IAC flags register, the processor knows which of the IAC buffers (e.g., Buffer1, Buffer2, Buffer3, etc. ) to read to obtain the correct IAC message.

In the currently preferred embodiment, the flags are read from FF00_0000. Writing a value to physical address FF00_0000 causes the value written to be logically ORed with the registers previous value. Writing a value to FF00_0008 clears the bits in the register that are set in the value written. For example, writing 0000_00FF to FF00_0008 would clear the register's lower byte.

Figure 5:
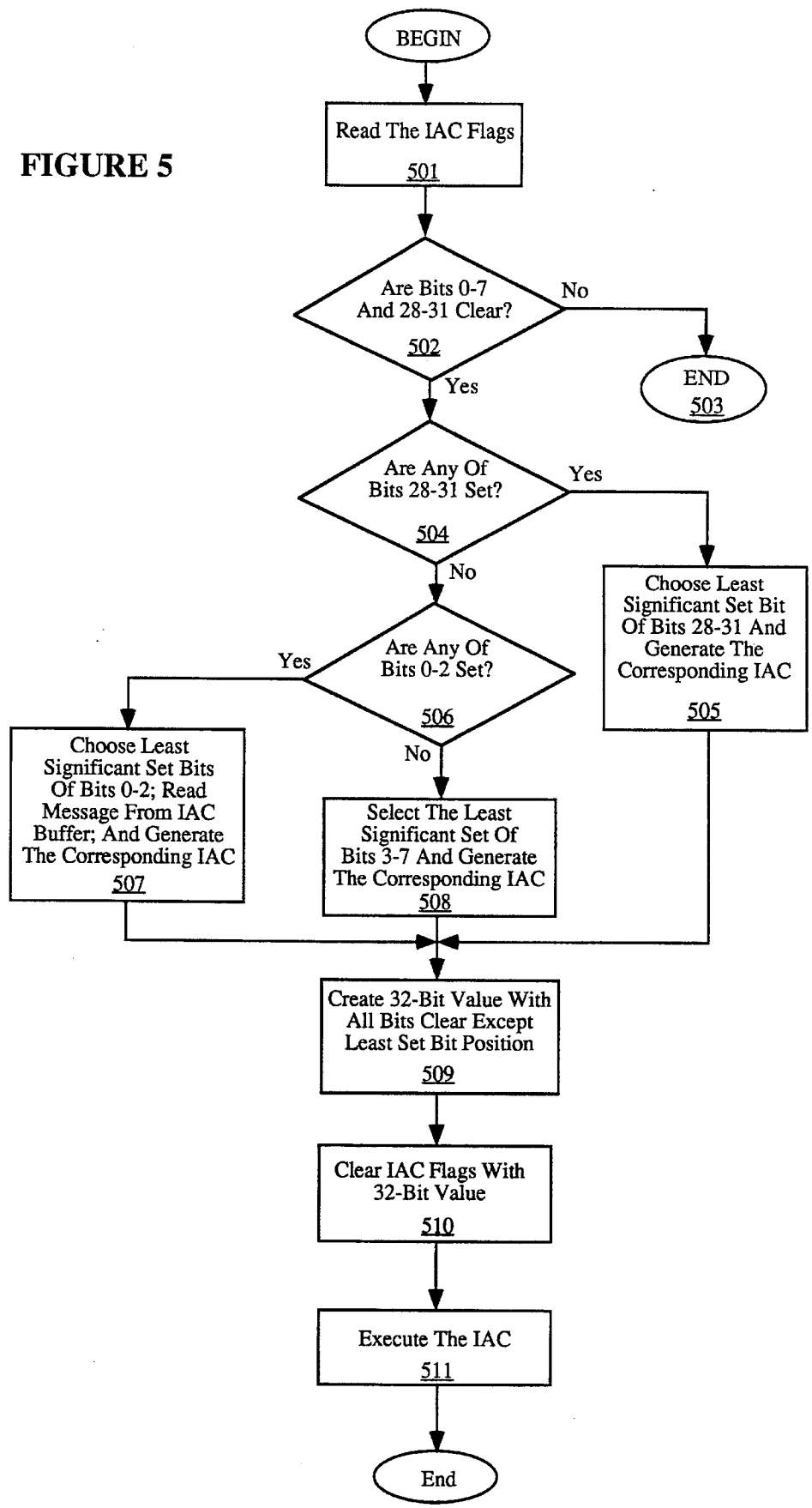
FIG. 5 is a flow chart depicting the steps the processor executes upon assertion of an IAC.

FIG. 5 is a flow chart that illustrates the steps the processor of the present invention executes in response to an asserted IAC. Referring to FIG. 5, the processor initially reads the IAC flags from physical address FF00_0000 (processing block 501). The processor then tests to see if bits 0–7 and 28–31 are clear (processing block 502). If bits 0–7 and 28–31 are all clear, then the processor does nothing (processing block 503).

If bits 0–7 and 28–31 are not all clear, a test then determines if any of bits 28–31 are set (processing block 504). If any of bits 28–31 are set, the processor chooses the least significant bit of bits 28–31 that is set and generates the corresponding Interrupt IAC (processing block 505). Processing then continues at processing block 509.

If none of bits 28–31 are set, a test determines if any of bits 0–2 are set (processing block 506). If any of bits 0–2 are set, then the processor chooses the least significant bit of bits 0–2 that is set, reads a quad-word from the corresponding IAC buffer, and generates the IAC defined by that quad-word (processing block 507). Processing then continues at processing block 509.

If none of the bits 28–31 or 0–2 is set, then the processor selects the least significant set bit of bits 3–7 and generates the corresponding IAC (processing block 508). The processor then creates a 32-bit value with all bits clear except bit i set, where i is the bit position that was selected in the IAC flags (processor block 509). Next, the processor writes that 32-bit value to physical address FF00_0008Hex to acknowledge the IAC and clears the corresponding flag (processing block 510). The processor then executes the IAC (processing block 511).

Therefore, when a processor desires to control an external cache, it sends an IAC message depicting the operation to be performed on the cache memory. If the IAC is internal, the memory manager triggers the IAC interrupt routine of the processor, if the IAC is external, the IAC is sent and stored in memory. The processor then signals the other processor, triggering its IAC mechanism. The other processor then goes to memory and reads the IAC. After reading the IAC, a microcode routine performs the operation according to the setting of the bits.

Figure 6:
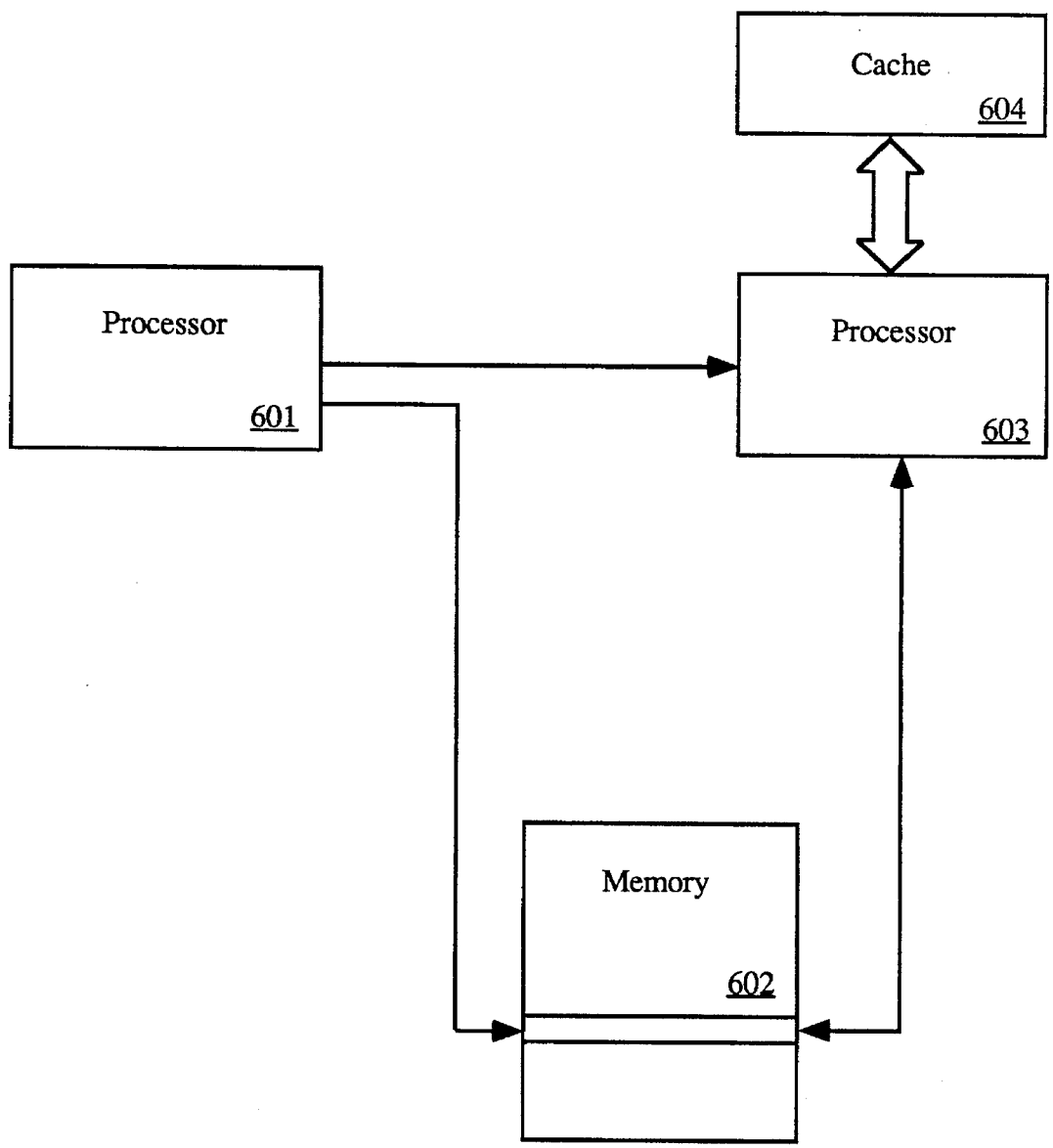
FIG. 6 is a block diagram illustrating an external IAC within the computer system.
Figure 7A:
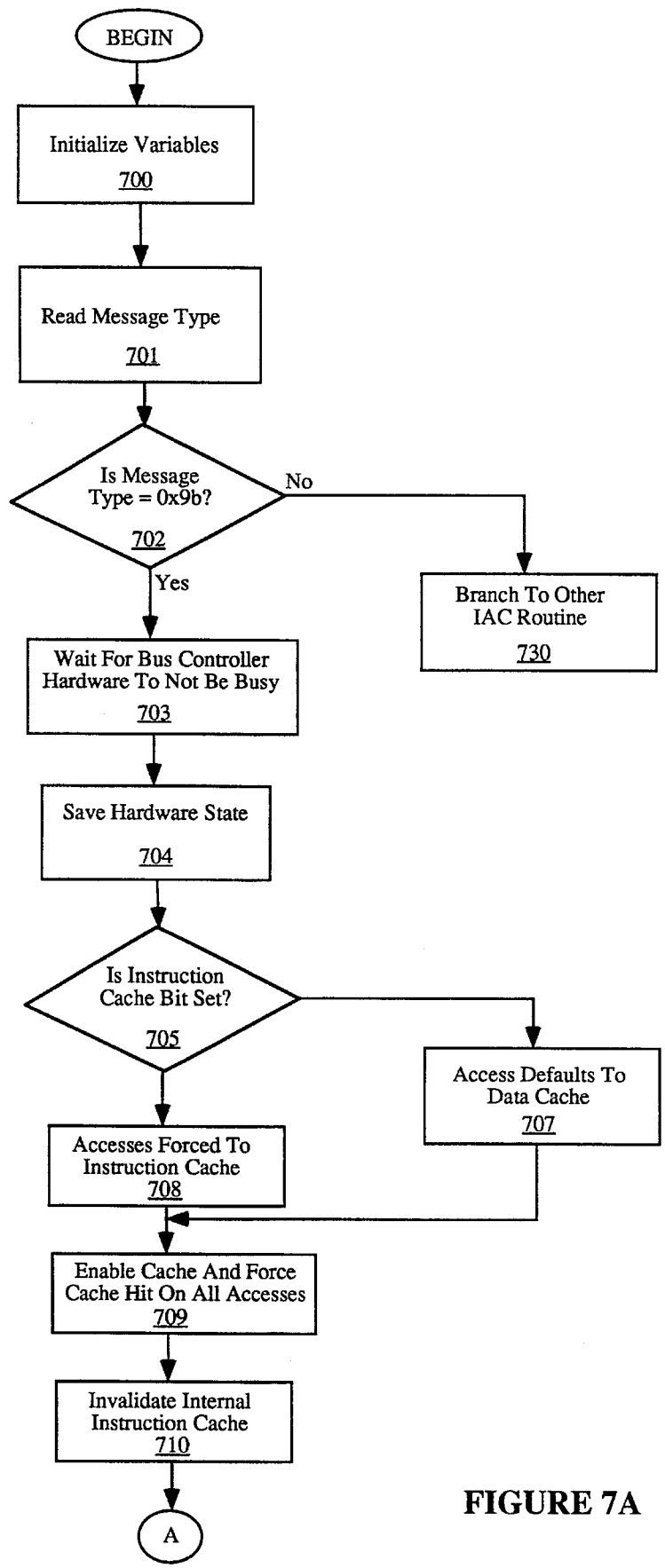
FIGS. 7a, 7b, 7c, and 7d illustrate a flow chart of the currently preferred embodiment of the microcode routine used to handle the external cache control IAC.
Figure 7B:
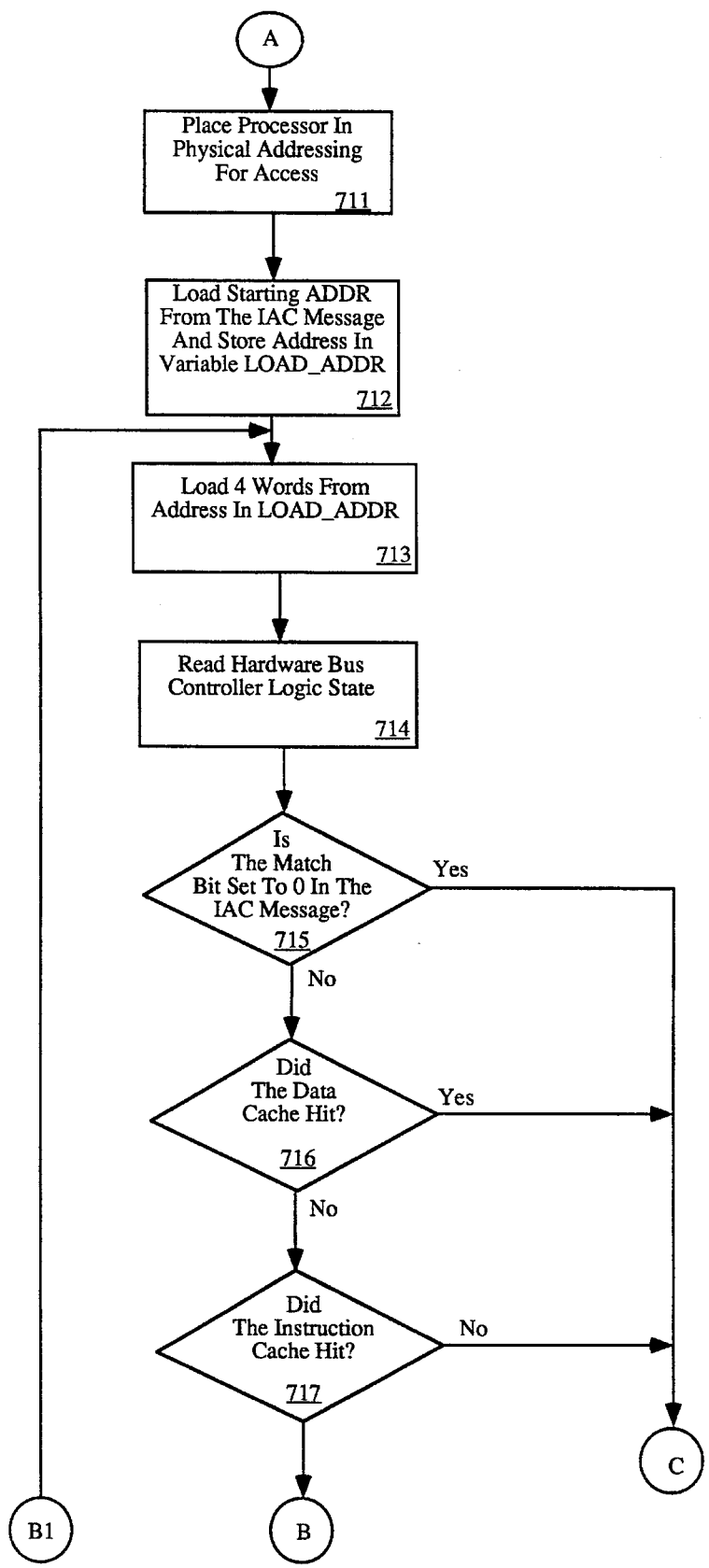
Figure 7C:
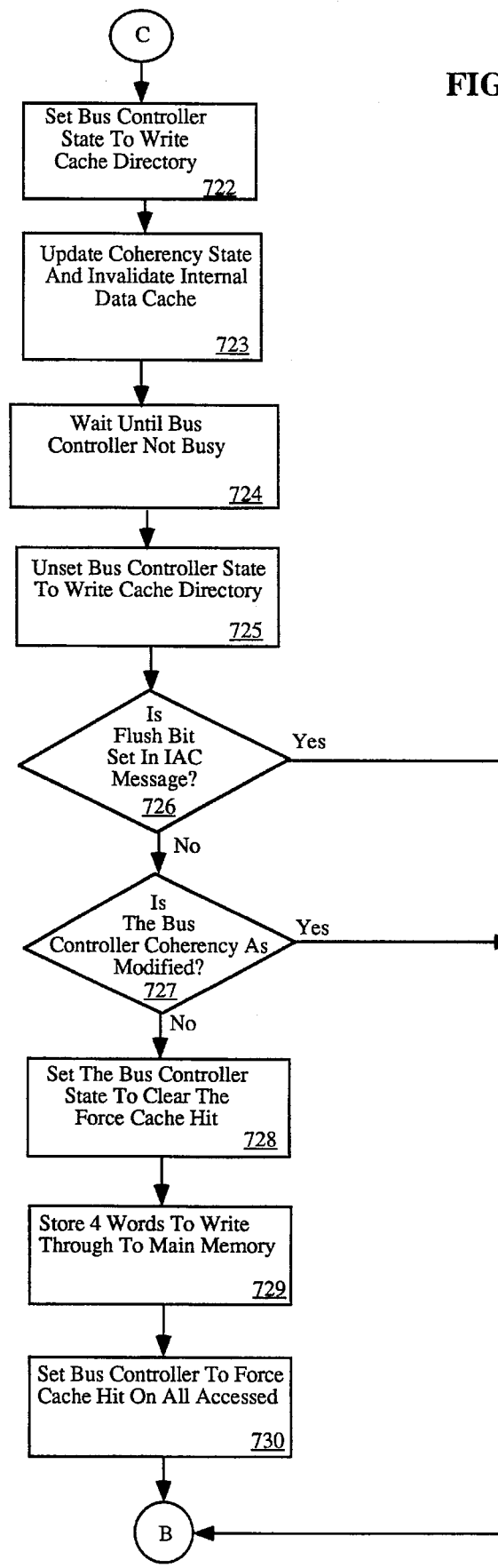
Figure 7D:
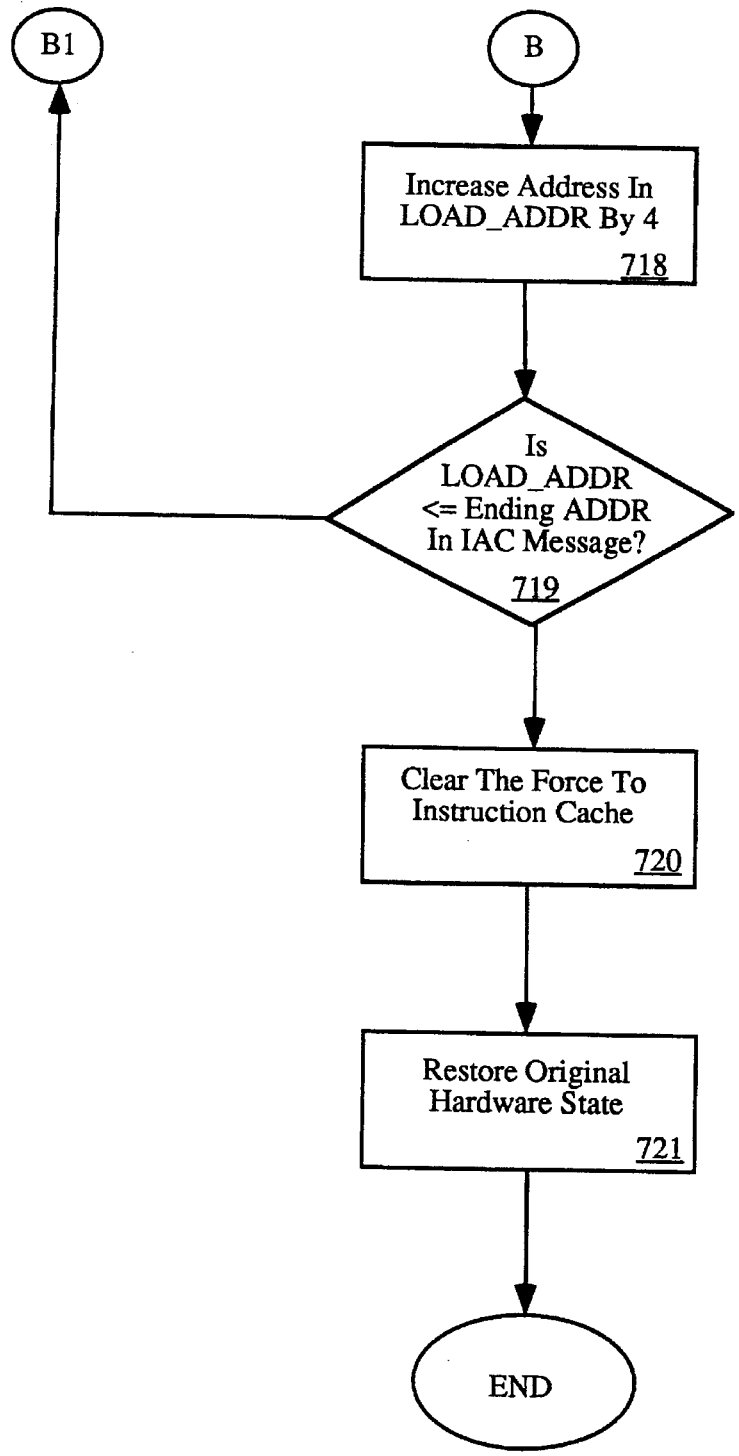

FIG. 6 illustrates a block diagram of the computer system, wherein processor 601 sends an IAC message to memory 602. Then processor 601 signals processor 603 that there is an IAC. In the currently preferred embodiment, this occurs by pulling the IAC pin of the other processor. In response, processor 603 branches to a microcode routine which causes the IAC message to be read and its corresponding operation to be performed.

Note that such an arrangement may be used during reset, where one processor is allowed to perform its IAC interrupt routine and then signal the other devices (e.g., processors), triggering their IAC mechanisms.

One Embodiment of the Microcode Routine of the Present Invention

Once an IAC is detected by any of the IAC methods, microcode performs a routine to handle the IAC. The currently preferred embodiment of the routine is illustrated in FIGS. 7a–d. Referring to FIGS 7a–d, variables are initialized (processing block 700). After initialization of variables and instructions, the microcode reads the IAC message type (processing block 701). Next, a test determines whether the IAC message type is 0x9B (processing block 702), indicating that the IAC message relates to an operation to control the external cache. If the message type is a cache control IAC, then processing continues at processing block 703; otherwise, processing continues by branching to another IAC routine (processing block 730).

Once a determination has been made that the IAC is a cache control IAC, the processor waits until the hardware bus controller is not busy (processing block 703). This occurs when the bus controller is not performing a transaction (i.e., a bus cycle). The current bus controller state is then saved (processing block 704). This includes information such as whether the instruction cache and data cache are combined or split, whether the caches enabled, or any other of the user specified hardware configuration information.

Processing then continues at processing block 705 by testing whether the IAC message is for the instruction cache or the data cache. If it is determined that the IAC is for the instruction cache, the bus control logic is set to force accesses (i.e., reads and writes) to the instruction cache (processing block 708). Otherwise, accesses default to the data cache (processing block 707). Note that normally load and store accesses can never access the instruction cache. However, the present invention includes a special mechanism which allows for the cache controller IAC to deal with the instruction cache if the mechanism is set. The backside cache of the present invention can be divided into instruction and data sections. If there is a normal instruction fetch, the backside bus signal BICache is asserted to indicate the instruction cache is being accessed. On a normal load or store, this signal is not asserted. In this manner, an indication is made to the bus controller to assert the BICache signal on a load or store, thereby directing the accesses to the backside instruction cache, so that loads and stores can occur to the instruction cache area.

The cache bus controller then enables the caches (e.g., data and instruction) and forces cache hits on all accesses (processing block 709), and the internal instruction cache is invalidated (processing block 710). The internal cache is invalidated because any over-writing of the external cache could cause the internal instruction cache and the external cache to be incoherent, such that the information in the internal cache is no longer valid.

Next, the processor is set to use physical addressing for accesses (processing block 711). Then the starting address in the IAC message is stored into the variable (LOAD_ADDR) (processing block 712). Next, a loop is entered in which the four words starting at the address in the variable LOAD_ADDR are loaded and stored into a temporary register (processing block 713).

The hardware bus controller state is then read (processing block 714). The state is read from the hardware registers in the cache bus control unit 208B that holds the state bits. The hardware registers give the microcode information regarding a particular cache line. In one embodiment, this information indicates whether a hit occurred or not (i.e., its tags matched) and indicates the MESI state This information allows the microcode to implement the function specified in the control bits.

Then a determination is made as to whether the match bit in the IAC message is set (processing block 715), thereby indicating that matching is to be used in the operation. If the match bit is set to a logical 0 and matching is not to be used, then processing continues at processing block 722; otherwise, if matching is to be used, another test determines if the data cache hit (processing block 716). If the data cache did hit, then the microprogram continues processing at processing block 722; otherwise, the microprogram continues at processing block 717. At processing block 717, a test is made to determine if the instruction cache hit. If the instruction cache hit, processing continues at processing block 722; otherwise, processing continues at processing block 718.

At processing block 722, the bus controller logic state is set to the write cache directory such that the data portion of the external cache is not written into. Next, a one word store is performed to the location in LOAD_ADDR, therein causing the coherency state of the external cache to be updated and causes the internal data cache to be invalidated (processing block 723). Next, a wait state is entered until the hardware bus controller is not busy (processing block 724). Then, the bus controller state is unset from the write cache directory (processing block 725).

A test then determines if the flush bit in the IAC message is set (processing block 725). If the flush bit is set (i.e., Field2 bit 0 equals 1 ), thereby indicating the cache location is not to be flushed, then processing continues at processing block 718; otherwise, processing continues at processing block 727 wherein another test determining whether the coherency state has been modified. If so, then processing branches to processing block 718. Otherwise, the bus controller logic state is set to clear the force cache hit on all accesses (processing block 728). The force hit must be cleared to allow the data to be written through to main memory. If not, then the cache would hit and data would be written only to the cache and not main memory. In the currently preferred embodiment, the bus controller logic state is cleared such that four words can be written through to main memory (processing block 729). Next, the bus controller logic state is set to force cache hit on all accesses (processing block 730). The processing continues at processing block 718.

At processing block 718, the address stored in LOAD_ADDR is incremented by four (its byte offset), then a test determines if the new address is less than or equal to the ending address in the IAC message (processing block 719). If the new address is less than or equal to the end address, the microprogram loops to continue at processing block 713;

otherwise, the bus controller logic is set to clear the force to the instruction cache (processing block 720), the original hardware state is restored (processing block 721), and the microprogram ends.

The pseudo code associated with the microcode routine is given below: (Note that this code executes after an IAC is detected via any of the IAC methods (i.e., external IAC, self-IAC via SYNCMOVQ or self-IAC via selfiac instruction. )

```
Struct (IAC_msg)
    type:            word 0; bits 24-21
    flush_mod:       word 0; bit 0
    dcache_icache    word 0; bit 1
    match:           word 0; bit 2
    new_coher:       word 0; bits 6-7
    start_addr:      word 1; bits 0-31
    end_addr:        word 2; bits 0-31
End_struct
Struct (HW_BCL_State)
    dcache_hit
    icache_hit
    coherency
End_struct
START
Read IAC_msg (type)
If (IAC_msg (type) = 0x9B
    Branch Flush_Inv_Cache_IAC
Else Branch Other_IAC
Flush_Inv_Cache_IAC
    Wait until HW Bus Controller (BCL) is not busy
    Read BCL state:  cache_ctrl    -> tmp2
                     coherency     -> tmp3
If (IAC_msg (dcache_icache) = icache)
    Set BCL state to force accesses to icache
Set BCL state to enable caches, force cache hit on all accesses
Invalidate Internal Icache
Set machine to use physical addressing for accesses
IAC_msg (start_addr) -> load_addr
Loop:
    Load_4_words (load_addr -> tmp1)
    Read (HW_BCL State)
    If (IAC_msg (match) ! = match)
        Branch Inner_loop
    If (HW_BCL_State(dcache_hit) ! = hit)
        Branch Inner_loop
    If (HW_BCL_State (icache_hit) ! = hit)
        Branch End_loop
Inner_loop:
    Set BCL state: write cache directory
    Store_1_word (tmp 1 -> load addr)
    Wait until HW Bus Controller (BCL) is not busy
    Set BCL state: unset write cache directory
    If (IAC_msg (flush_mod) ! = flush
        Branch End_loop
    If (HW_BCL State (coherency) ! = modified)
        Branch End_loop
    Set BCL state: clear force cache hit on all accesses
    Store_4_words (tmp1 -> load_addr)
    Set BCL state: force cache hit on all accesses
End_loop:
    load_addr + 4 -> load_addr
    If (load_addr <= IAC_msg (end_addr)
    Branch Loop
Set BCL state:       clear force to icache
Set BCL state:       tmp2 -> cache_ctrl
                     tmp3 -> coherency
END
```

It should be noted that other microcode routines may be created to perform the same functions as the routine above.

Thus, by using the microcode routine above, in conjunction with the cache bus control logic, the present invention allows for the system and user software to manipulate an external cache. This manipulation could occur during system reset of the external cache. In other embodiments, this manipulation could occur when it is desired to place the cache in a known state. Note also that the software does not require knowledge of the cache organization to accomplish the functions desired (e.g., flushing invalidating, etc.). For example, the present invention provides the ability to invalidate an external cache based on an address range (as specified in the IAC message). That is, since only a range of addresses are specified in the IAC message and the address range specified is not dependent on the size or organization of the external cache, the software is only dependent on the processor performing the routine. Therefore, the software utilizing the present invention could easily be ported to hardware systems which have varying sized caches.

As shown in the routine, the present invention also allows numerous manipulations of a cache line in one operation (or instruction). For example, using the present invention, the control bits in an IAC message could be set such that the software provides a new coherency state for the cache in the same operation as a flush or invalidate action. Therefore, the present invention is able to modify the MESI state of the cache lines and is able to have multiple operations performed on a cache line or set of lines by manipulating the control bits of the IAC message.

Similarly, the present invention allows one operation to influence multiple lines in a cache, such as flushing or invalidating an entire cache range. In this manner, the present invention provides a mechanism for invalidating an external cache upon system reset.

Moreover, by use of the interagent communication mechanism, the present invention allows all of the processors in a multi-processor system to have the ability to modify the private caches of every processor. That is, the present invention allows the coherency state of any external cache to be modified by any other processor. The reason this might be done is to maintain cache coherency. Furthermore, the present invention allows any processor to flush the contents of another processor's write-back cache to main memory at times other than those specified by the write-back algorithm. Note that this is useful in examining the contents of the cache or when performing certain multiprocessor synchronization operations.

Whereas many alterations and modifications of the present invention will no doubt become apparent to a person of ordinary skill in the art after having read the foregoing description, it is to be understood that the particular embodiment shown and described by way of illustration is in no way intended to be considered limiting. Therefore, references to details of the preferred embodiment are not intended to limit the scope of the claims which in themselves recite only those features regarded as essential to the invention.

Thus, a method and apparatus for controlling an external cache has been described.

We claim:

1. A processor for use in a computer system having an external cache that includes a plurality of lines storing information, said processor comprising:

bus means coupled to the external cache for transferring the data and the plurality of instructions; and cache controlling means coupled to the bus means for controlling the external cache in response to interagent communications received from a memory, wherein the interagent communication comprises a plurality of control bits, wherein the cache controlling means performs cache control operations according to the setting of each of the plurality of control bits, such that the external cache is controlled from within the processor.

2. The processor as defined in claim 1 wherein the cache controlling means flushes a plurality of cache lines in the external cache in one operation in response to one of the interagent communications.

3. The processor as defined in claim 2 wherein the plurality of lines is specified in said one interagent communication.

4. The processor as defined in claim 1 wherein the cache controlling means invalidates a plurality of cache lines in the external cache in one operation in response to one of the interagent communications.

5. The processor as defined in claim 4 wherein the plurality of lines is specified in said one interagent communication.

6. The processor as defined in claim 1 wherein the cache controlling means modifies coherency state information associated with a line in the external cache in response to one of the interagent communications.

7. The processor as defined in claim 1 wherein the cache controlling means performs at least one operation on a plurality of lines of the cache based on an address range specified in each of the interagent communication.

8. The processor as defined in claim 1 wherein the cache control logic flushes a plurality of cache lines in the external cache in one operation in response to an interagent communication.

9. The computer system as defined in claim 1 wherein the memory storing the interagent communication comprises a dedicated set of registers in the processor.

10. The computer system as defined in claim 1 wherein the processor further comprises an event unit which indicates that the interagent communication exists and further comprises a means for branching to a microcode routine to handle the interagent communications.

11. The computer system as defined in claim 10 further comprising means for detecting existence of one of the interagent communications by detecting a specific address in an instruction executed by the processor.

12. The processor defined in claim 1 further comprising:
an instruction fetching means coupled to the bus means for fetching the plurality of instructions;
instruction decoding means coupled to the instruction fetching means for decoding the plurality of instructions;
executing means coupled to the instruction decoding means for executing the plurality of instructions.

13. A processor for use in a computer system having an external cache memory and at least one other memory external to the processor, the processor comprising:
an execution data path that processes information;
a unit that receives a first interagent communication passed through said at least one other memory, said interagent communication specifying at least one cache control operation;
a microcode engine for executing a set of microcode instructions that includes a routine to control the external cache according to said at least one cache control operation, such that at least one line of the external cache is flushed when said at least one cache control operation comprises a flush operation, at least one line of the external cache is invalidated when said at least one cache control operation comprises an invalidate operation, and coherency state of at least one line of the external cache is modified when said at least one cache control operation comprises a modify coherency operation.

14. The processor as defined in claim 13 wherein further comprising a cache controller that operates in conjunction with the microcode engine to perform said at least one cache control operation.

15. The processor as defined in claim 13 further comprising a pin that indicates that the first interagent communication is present in said at least one other memory.

16. The processor as defined in claim 13 further comprising:
means for sending a second interagent communication to one said other memory; and
means for asserting an interagent communication pin on another device.

17. A processor for use in a computer system having an external cache, wherein the external cache includes a plurality of lines, said processor comprising:
a control unit coupled to the external cache to transfer information;
an executing unit coupled to the control unit that executes a plurality of instructions; and
wherein the control unit includes cache control logic that controls the external cache in response to an interagent communication received from a memory, wherein the interagent communication includes a plurality of control bits, wherein the cache control logic performs cache control operations according to the setting of each of the plurality of control bits, such that the external cache is controlled from within the processor.

18. The processor as defined in claim 17 wherein source of the interagent communication is external to the processor.

19. The processor as defined in claim 17 wherein the cache controlling means invalidates a plurality of cache lines in the external cache in one operation in response to one of the interagent communications.

20. The processor as defined in claim 17 wherein the interagent communication further includes means for specifying an address range, such that the cache control logic performs cache control operations on the address range in the external cache according to the setting of each of the plurality of control bits.

21. The processor as defined in claim 20 wherein the means for specifying an address range comprises a starting address field for storing the starting address of the address range and an ending address field for storing the ending address of the address range.

22. The processor as defined in claim 17 wherein the cache control logic flushes at least one cache line in the external cache when at least one of the control bits is set.

23. The processor as defined in claim 17 wherein the cache control logic invalidates at least one cache line in the external cache when at least one of the control bits is set.

24. The processor as defined in claim 17 wherein the cache control logic modifies coherency state of at least one cache line in the external cache when at least one of the control bits is set.

25. A computer system comprising:
bus means for communicating information;
a memory means coupled to the bus means for storing information;
a first processing means coupled to the bus means for executing the plurality of instructions;
a cache memory means coupled to the first processing means for storing information requested by the first processing means, wherein the cache memory means includes a plurality of cache lines and is external to the first processing means;

wherein the first processing means includes cache controlling means for controlling the cache memory means in response to an interagent communication passed through memory, such that at least one of the lines in the cache memory means is flushed, invalidated and/or its coherency state modified by the first processing means.

26. The computer system as defined in claim 25 further comprising a second processing means for processing information, wherein the second processing means stores the interagent communication in the memory means and signals the first processing means that the interagent communication exists.

27. The computer system as defined in claim 25 wherein the means for indicating includes means for receiving a communication, wherein the communication depicts said at least one operation to be performed to the first processing means.

28. The computer system as defined in claim 27 wherein the source of the communication is internal to the first processing means.

29. The computer system as defined in claim 27 wherein the source of the communication is external to the first processing means.

30. The computer system as defined in claim 29 further comprising means for reading the interagent communication from said memory means.

31. The computer system as defined in claim 29 wherein the source of the communication is from a second processing means, wherein the second processing means causes assertion of a pin on the first processing means coupled to the bus means for executing at least one of the plurality of instructions.

32. A computer system comprising:
a bus for communicating information;
at least one memory coupled to the bus for storing information;
a first processor coupled to the bus for executing a plurality of instructions;
a cache memory coupled to the first processor for storing information requested by the first processor, wherein the cache memory includes a plurality of cache lines and is external to the first processing means;
wherein the first processor includes circuit logic for receiving a interagent communication that indicates at least one cache control operation and cache control logic for controlling the cache memory in response to the interagent communication,
and wherein the interagent communication comprises a plurality of bits for specifying at least one cache control operation and an address range, such that at least one of the lines in the cache memory is flushed, invalidated and/or its coherency state modified by the first processor according to the plurality of bits and the address range in the interagent communication.

33. A method for allowing a first processor in a computer system, having at least one memory, to control an external cache of a second processor in the computer system, wherein the external cache is not accessible to the first processor, the method comprising the steps of:
said first processor sending a interagent communication, wherein the interagent communication includes a plurality of bits for specifying at least one cache control operation and an address range;
storing the interagent communication in said at least one memory;
signaling the second processor that the interagent communication is available;
said second processor reading the interagent communication from said at least one memory, such that the second processor performs the cache control operation according to the plurality of bits in the interagent communication.

34. The method as defined in claim 33 wherein the interagent communication specifies a flush operation, such that the second processor flushes at least one line of the external cache in response to reading and performing the cache control operation.

35. The method as defined in claim 33 wherein the interagent communication specifies to modify coherency state of the external cache, such that the second processor modifies the coherency state of at least one line of the external cache in response to reading and performing the cache control operation.

36. A method for modifying coherency state of the external cache of a first processor by a second processor in a multiprocessing system comprising the steps of:
said second processor sending a message to main memory, wherein the message indicates a cache control operation to be performed;
said second processor asserting a IAC pin of the first processor;
said first processor reading the message from main memory to determine the operation;
said first processor performing the operation on the cache.

37. A computer system comprising:
a bus that communicates information;
a memory coupled to the bus that stores information;
a first processor coupled to the bus that executes the plurality of instructions;
an external cache coupled to the first processor that stores information requested by the first processor, wherein the cache includes a plurality of cache lines and is external to the first processor;
wherein the first processor includes a cache control logic that controls the cache in response to an interagent communication received from a memory, wherein the interagent communication includes a plurality of control bits, wherein the cache control logic performs cache control operations according to the setting of each of the plurality of control bits, such that at least one of the lines in the cache memory is flushed, invalidated and/or its coherency state modified by the first processor.

38. The computer system as defined in claim 37 wherein the cache control logic flushes a plurality of cache lines in the external cache in one operation in response to the interagent communication.

39. The computer system as defined in claim 37 wherein the control logic invalidates a plurality of cache lines in the external cache in one operation in response to the interagent communication.

40. The computer system as defined in claim 39 wherein the source of the interagent communication is internal to the first processor.

41. The computer system as defined in claim 39 wherein the source of the interagent communication is external to the first processor.

42. The computer system as defined in claim 41 further comprising circuit logic that reads the interagent communication from an external memory.

43. The computer system as defined in claim 41 wherein the source of interagent communication is from a second processor coupled to the bus.

* * * * *

UNITED STATES PATENT AND TRADEMARK OFFICE
CERTIFICATE OF CORRECTION

PATENT NO. : 5,524,233
DATED : June 4, 1996
INVENTOR(S) : Milburn et al.

It is certified that error appears in the above-identified patent and that said Letters Patent is hereby corrected as shown below:

In column 13 at line 1 delete "perdorms" and insert --performs--

In column 15 at line 36 delete "Read (HW_BCL State)" and insert --Read(HW_BCL_State)--

In column 15 at line 48 delete "If (HW_BCL State (coherency) ! = modified)" and insert --If (HW_BCL_State (coherency) ! = modified)--

Signed and Sealed this

Sixteenth Day of September, 1997

*Attest:*

*Attesting Officer*

BRUCE LEHMAN

*Commissioner of Patents and Trademarks*